United States Patent
Kim

(10) Patent No.: US 8,368,515 B2
(45) Date of Patent: Feb. 5, 2013

(54) DUAL MODE RFID COMMUNICATION DEVICE OPERATING AS A READER OR TAG

(75) Inventor: Bongyoung Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 204 days.

(21) Appl. No.: 12/707,003

(22) Filed: Feb. 17, 2010

(65) Prior Publication Data

US 2010/0207735 A1    Aug. 19, 2010

(30) Foreign Application Priority Data

Feb. 18, 2009    (KR) .................. 10-2009-0013484

(51) Int. Cl.
*H04Q 5/22*    (2006.01)
*H04B 1/16*    (2006.01)
*H01Q 23/00*    (2006.01)

(52) U.S. Cl. ............ 340/10.1; 340/572.5; 340/572.7; 343/741; 455/74; 455/344

(58) Field of Classification Search .... 340/572.1–572.5, 340/572.7, 10.1, 10.5–10.52; 343/741–742; 455/66.1, 74, 344

See application file for complete search history.

(56) References Cited

U.S. PATENT DOCUMENTS

| | | | | |
|---|---|---|---|---|
| 7,706,834 B2* | 4/2010 | Kim et al. | .............. | 455/552.1 |
| 8,018,344 B2* | 9/2011 | Chang et al. | .............. | 340/572.1 |
| 2006/0052055 A1* | 3/2006 | Rowse et al. | .............. | 455/41.1 |
| 2006/0145660 A1* | 7/2006 | Black et al. | .............. | 320/108 |
| 2006/0263681 A1* | 11/2006 | Lee | .............. | 429/176 |
| 2007/0034700 A1 | 2/2007 | Poidomani et al. | | |
| 2007/0057851 A1* | 3/2007 | Leizerovich et al. | .............. | 343/702 |
| 2007/0155443 A1* | 7/2007 | Cheon et al. | .............. | 455/572 |
| 2007/0194945 A1* | 8/2007 | Atkinson | .............. | 340/825.72 |
| 2008/0012712 A1 | 1/2008 | Shimizu | | |
| 2008/0032626 A1* | 2/2008 | Chen | .............. | 455/41.1 |
| 2008/0090540 A1* | 4/2008 | Rofougaran | .............. | 455/289 |
| 2008/0099559 A1* | 5/2008 | Lo et al. | .............. | 235/441 |
| 2008/0272889 A1* | 11/2008 | Symons | .............. | 340/10.1 |
| 2009/0079572 A1 | 3/2009 | Atsumi et al. | | |
| 2009/0121835 A1* | 5/2009 | Borret et al. | .............. | 340/10.1 |

(Continued)

FOREIGN PATENT DOCUMENTS

| | | |
|---|---|---|
| JP | 2008-022435 | 1/2008 |
| KR | 10-2000-0033877 | 6/2000 |

(Continued)

OTHER PUBLICATIONS

KIPO Office action dated Aug. 27, 2010, for Korean priority Patent application 10-2009-013484.

*Primary Examiner* — Benjamin C Lee
*Assistant Examiner* — Stephen Burgdorf
(74) *Attorney, Agent, or Firm* — Christie, Parker & Hale, LLP

(57) ABSTRACT

An RFID device, and more particularly to a RFID device which can be used in both a tag mode and a reader mode. There is provided an RF antenna transmitting and receiving wireless signals; a tuning circuit as a frequency filtering circuit connected to the RF antenna; a memory storing data; and a wireless communication card including antenna connection terminals connected to the RF antenna.

18 Claims, 2 Drawing Sheets

U.S. PATENT DOCUMENTS

| | | | |
|---|---|---|---|
| 2009/0150704 A1* | 6/2009 | Van Bosch | 713/340 |
| 2009/0207025 A1* | 8/2009 | Rofougaran et al. | 340/572.1 |
| 2009/0291634 A1* | 11/2009 | Saarisalo | 455/41.1 |
| 2009/0325488 A1* | 12/2009 | Seol et al. | 455/41.2 |
| 2010/0207575 A1* | 8/2010 | Pijnenburg et al. | 320/108 |
| 2010/0279606 A1* | 11/2010 | Hillan et al. | 455/41.1 |

FOREIGN PATENT DOCUMENTS

| | | |
|---|---|---|
| KR | 10-2006-0068119 | 6/2006 |
| KR | 10-2007-0109450 | 11/2007 |
| KR | 10-2008-0003006 | 1/2008 |
| KR | 10-2008-0019627 | 3/2008 |

* cited by examiner

DUAL MODE RFID COMMUNICATION DEVICE OPERATING AS A READER OR TAG

CROSS-REFERENCE TO RELATED APPLICATION

This application claims the benefit of Korean Application No. 10-2009-0013484, filed Feb. 18, 2009, in the Korean Intellectual Property Office, the disclosure of which is incorporated herein by reference.

BACKGROUND OF THE INVENTION

1. Field of the Invention

Aspects of the present invention relate to a near field communication device, and more particularly to an RFID communication device using a frequency of 13.56 MHz.

2. Description of the Related Art

Radio frequency identification (RFID) is a non-contact type automatic identification technique in which an RFID tag attached to an identification object and operated in a passive mode and an RFID reader operated in an active mode communicate with each other through transmission and reception of signals using a radio frequency in order to automatically identify an object using wireless radio waves. Since the RFID technique can overcome shortcomings of an existing automatic identification technique such as a barcode and an optical character identification technique, it is being applied to credit cards.

A credit card with an existing RF function is designed to be used only in passive mode using a frequency of 13.56 MHz. Induction currents generated by a radio wave emitted from an RF reader activate an RF chip mounted on a credit card so that communication is made between the credit card and the RF reader. Since a credit card with an existing RF function inevitably needs a reader for communication, its use is limited and can be improved.

SUMMARY OF THE INVENTION

Aspects of the present invention have been made in view of the above noted circumstance and provide a Radio Frequency Identification (RFID) communication device including a card enabling communication without a reader.

Aspects of the present invention also provide an RFID communication device operated in a passive or active mode.

Aspects of the present invention also provide an RFID communication device facilitating use of data.

In accordance with an aspect of the present invention, there is provided an RFID communication device comprising a wireless communication card including an RF antenna transmitting and receiving wireless signals; a tuning circuit as a frequency filtering circuit connected to the RF antenna; a memory storing data; and antenna connection terminals connected to the RF antenna. The wireless communication card may further include a rechargeable secondary battery, which includes a bare cell, two charge/discharge terminals connected to the bare cell, and a protection circuit controlling charge and discharge of the bare cell. The number of antenna connection terminals may be three and one of the antenna connection terminals may be shared with the one of the charge/discharge terminals.

The tuning circuit may be a 13.56 MHz frequency filtering circuit.

The RFID communication device may include a communication controller chip supporting both an RFID tag mode and a reader mode and may further include a wireless communication controller set connected to the wireless communication card.

The communication controller chip of the wireless communication controller set may be a near field communications (NFC) chip.

The wireless communication controller set may further include a matching circuit as a frequency filtering circuit connecting the antenna connection terminals of the wireless communication card and the communication controller chip.

The wireless communication card may further include a secondary battery for providing power to the wireless communication controller set.

The wireless communication controller set may further include an output unit outputting data stored in the memory of the wireless communication card.

The wireless communication controller set may further include a power source therein.

The wireless communication card may further include a controller unit controlling the memory.

In accordance with another aspect of the present invention, there is provided a credit card including an RF antenna transmitting and receiving wireless signals; a tuning circuit as a frequency filtering circuit connected to the RF antenna; a memory storing data; a controller unit controlling the tuning circuit and the memory; and antenna connection terminals connected to the RF antenna.

Various types of RFID communications can be enabled and data can be easily confirmed by providing the antenna connection terminal connected to the RF antenna and the wireless communication memory card for storing data.

Further, the wireless communication controller set supporting both an RFID tag mode and a reader mode is coupled to the wireless communication card in order to operate in both passive and active modes.

Moreover, usage time for RFID communication can be prolonged by providing the wireless communication card with a secondary battery supplying power to the wireless communication controller set coupled to the wireless communication card.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
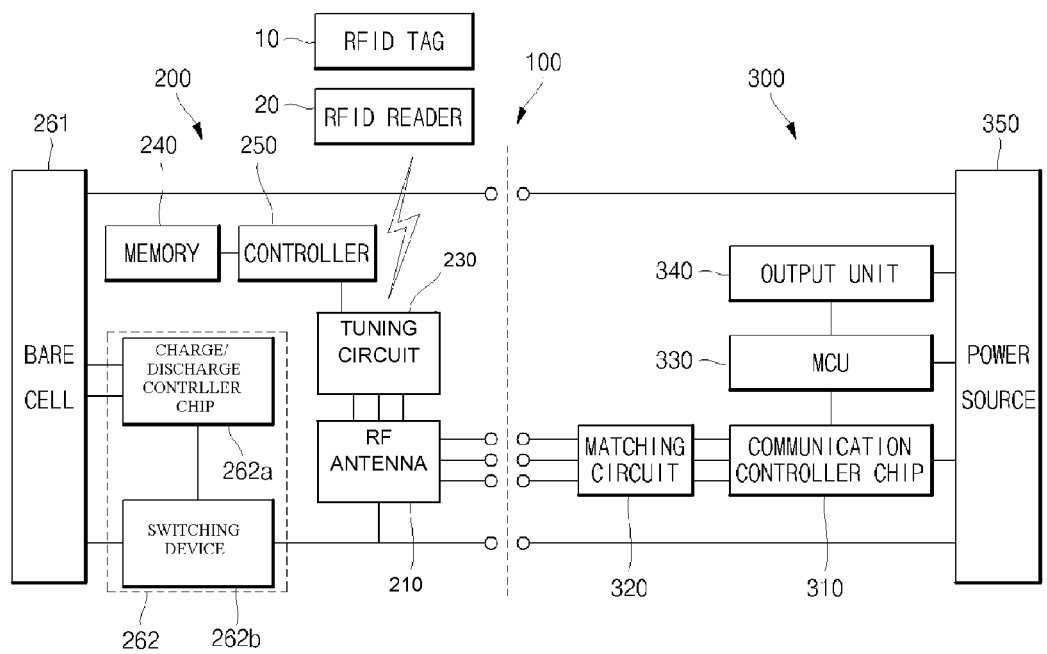
FIG. 1 is a block diagram illustrating an RFID communication device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

Herein, when a first element is described as being connected to a second element, the first element may be not be only directly connected to the second element but may also be indirectly connected to the second element via a third element.

Figure 2:
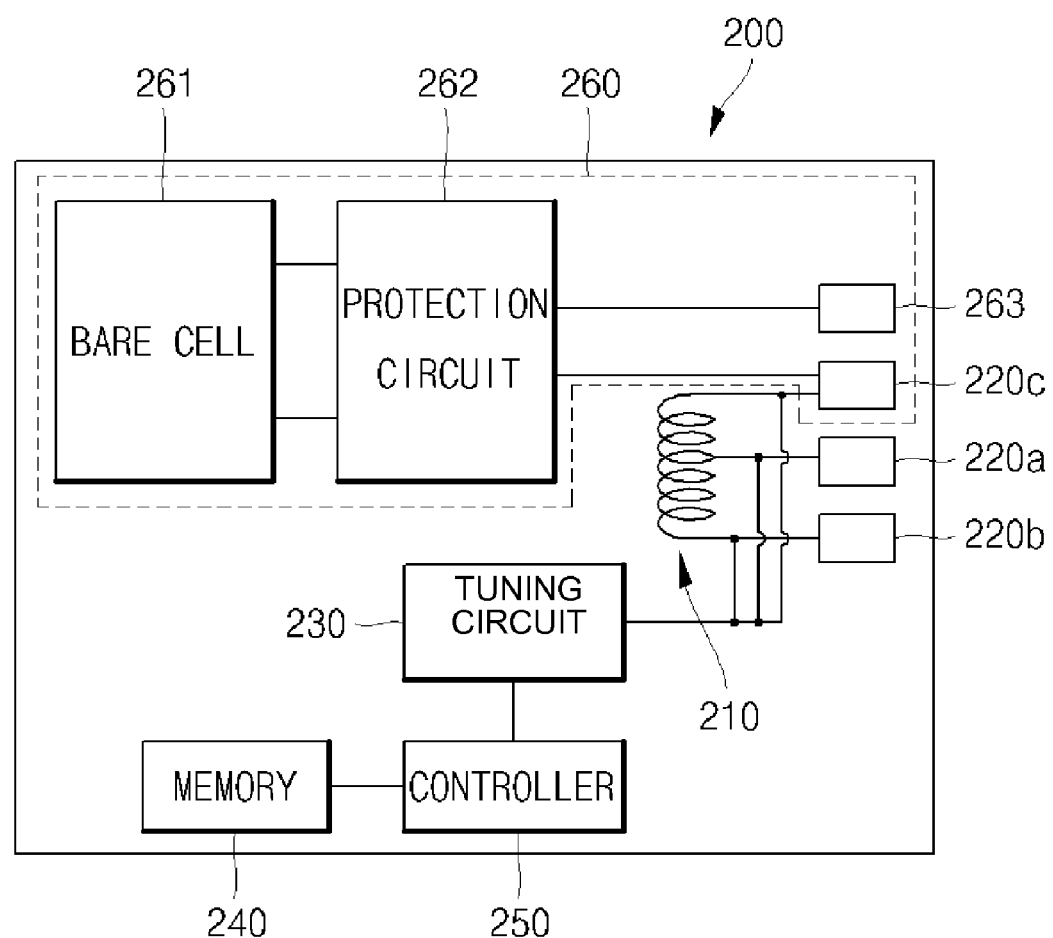
FIG. 2 is a block diagram illustrating a circuit of a wireless communication card illustrated in the FIG. 1.

FIG. 1 is a block diagram illustrating an RFID communication device according to an embodiment of the present invention. FIG. 2 is a view illustrating a circuit of a wireless communication card illustrated in the FIG. 1.

Referring to FIG. 1, an RFID communication device 100 includes a wireless communication card 200, and a wireless communication controller set 300.

Referring to FIGS. 1 and 2, the wireless communication card 200 is a credit card, and includes an RF antenna 210, three antenna connection terminals 220a, 220b, and 220c, a tuning circuit 230, a memory 240, a controller 250, and a secondary battery 260. The wireless communication card 200 communicates with an external RFID tag 10 or an RFID reader 20, and stores data into a memory 240.

The RF antenna 210 selectively identifies a radio wave having a frequency of 13.56 MHz from among radio waves radiated in the air for RFID communication. In active mode the RF antenna 210 transmits RF communication data to the outside in active mode. The RF antenna 210 is a general loop antenna used for both passive and active mode.

The three antenna connection terminals 220a, 220b, and 220c are connected to the RF antenna 210, and are exposed to the outside of the wireless communication card 200. The three antenna connection terminals 220a, 220b, and 220c support both active and passive modes. The three antenna connection terminals 220a, 220b, and 220c are made of a conductive material and are located in parallel to be exposed to a short edge of the wireless communication card 200. The location of the three antenna connection terminals 220a, 220b, and 220c may vary according to the structure of the wireless communication card 200.

The tuning circuit 230 is electrically connected to the three antenna connection terminals 220a, 220b, and 220c respectively, and is electrically connected to the RF antenna 210. The tuning circuit 230 filters a frequency of 13.56 MHz. The tuning circuit 230 is a general circuit used for RFID communication.

Basic data about RFID and diverse data are stored in the memory 240. For instance, when the RFID communication device 100 is used as a transportation card, detailed data about means of transportation, sections of a line, fares, and transportation time may be stored in the memory 240. The memory 240 is a non-volatile memory such as a flash memory, wherein data stored therein are not erased even when power is not supplied to it.

The controller 250 is electrically connected to the RF antenna 210 and the memory 240. The controller 250 transmits data stored in memory 240 to the outside through the RF antenna 210, or stores data received by the RF antenna 210 in the memory 240. When the controller 250 is in passive mode, it is operated by currents induced by radio waves emitted from the RFID reader 20. When the controller 250 is in active mode, it is operated by power provided by a wireless communication controller set 300 received through the RF antenna 210. The controller 250 is provided in the form of an integrated circuit (IC) chip. Although a controller 250 is provided in the embodiment of the present invention, it may not be included in another embodiment of the present invention. In the absence of a controller 250, the memory 240 may be controlled by a microcontroller unit (MCU) 330 mounted on the wireless communication controller set 300. In this case, the memory 240 may be connected to the MCU 330 of the wireless communication controller set 300 through the antenna connection terminals 220a, 220b, and 220c.

The secondary battery 260 includes a bare cell 261, a protection circuit 262, and two charge/discharge terminals 263 and 220c. The secondary battery 260 supplies power to the wireless communication controller set 300.

Although not illustrated in detail, the bare cell 261 is an electrical energy source, and may include an electrode assembly (not shown) and a pouch (not shown) surrounding the electrode assembly (not shown). The electrode assembly may include a first electrode plate (not shown), a second electrode plate (not shown), and a separator (not shown). The electrode assembly may have a form of a plate in which the separator is located between the first electrode plate and the second electrode plate. The electrode assembly is sealed by the pouch (not shown) together with a polymeric electrolyte. Although not illustrated, the bare cell 261 includes a positive electrode terminal and a negative electrode terminal connected to the protection circuit 262.

The protection circuit 262 is electrically connected between the two charge/discharge terminals 263 and 220c, and controls charge and discharge of the bare cell 261. The protection circuit 262 includes a charge/discharge controller chip 262a and a switching device 262b. The charge/discharge controller chip 262a monitors data about the voltage and charge/discharge current of the bare cell 261, and outputs control signals to protect the bare cell 261 from over-charge, over-discharge, and over-currents. The switching device 262b is located on a path of charge/discharge currents of the bare cell 261 and sets the direction of currents so that either a charge or a discharge operation is possible according to the control signal of the charge/discharge controller chip 262a. Although not illustrated, the switching device 262b may include a charge FET and a discharge FET connected in series. The charge FET is turned on and the discharge FET is turned off in order to allow the switching device 262b to flow only charging currents of the switching device 262b. On the other hand, the charge FET is turned off and the discharge FET is turned on in order to allow the switching device 262b to flow only discharging currents during the discharging operation of the switching device 262b. Although not illustrated, the protection circuit 262 may include other electronic circuit devices such as a resistor, a capacitor, and a thermal fuse.

The two charge/discharge terminals 263 and 220c are connected to the protection circuit 262. When the two charge/discharge terminals 263 and 220c are connected to a charger (not shown), the bare cell 261 is charged under the control of the protection circuit 262. When an external load such as a wireless communication controller set 300 is connected to the two charge/discharge terminals, power is supplied to the external load under the control of the protection circuit 262. One of the two charge/discharge terminals 263 and 220c is shared and thus is one of the three antenna connection terminals 220a, 220b, and 220c so that space for a terminal can be saved.

The wireless communication controller set 300 includes a communication controller chip 310, a matching circuit 320, an MCU 330, an output unit 340, and a power source 350. The wireless communication controller set 300 controls RFID communication by using the RF antenna 210 of the wireless communication card 200. The wireless communication controller set 300 may be a mobile communication terminal such as a mobile phone, a mobile computer or a peripheral attachable to a mobile computer, an electronic book, a personal digital assistant, a mobile audio/video device or a similar mobile device.

The communication control chip 310 supports both an RFID tag mode as a passive mode and an RFID reader mode as an active mode. In the present embodiment of the present invention, the communication control chip 310 is a near field communication (NFC) chip widely used for near field communication, however aspects of the present invention are not limited thereto.

The matching circuit 320 is a frequency filtering circuit connecting the communication control chip 310 and the antenna connection terminals 220a, 220b, and 220c of the wireless communication card 200. The matching circuit 320 includes a plurality of capacitors connected in series or in parallel.

The MCU 330 is connected to the communication control chip 310 to control the operation mode of the communication control chip 310. Selection of the operation mode by a user is transmitted to the communication control chip 310 through the MCU 330 to determine the operation mode of the communication control chip 310. A user can read and modify the data stored in the memory 240 of the wireless communication card 200 through the MCU 330. The MCU 330 may be a central processing unit (CPU) provided in a terminal (for example, a mobile phone) used as the wireless communication controller set 300.

The output unit 340 is controlled by the MCU 330 and can provide the data stored in the memory 240 of the wireless communication card 200 to the user. The output unit 340 may be a display device or a speaker unit, and may be a LCD display or a speaker provided in a terminal (for example, a mobile phone) used as the wireless communication controller set 300.

The power source 350 supplies power to the communication controller chip 310, the MCU 330 and the output unit 340. The power source 350 may be a secondary battery provided in a terminal (for example, a mobile phone) used as the wireless communication controller set 300. The power source 350 is connected to the charge/discharge terminals 263 and 220c of the wireless communication card 200. When the power source 350 is fully discharged, the bare cell 261 of the wireless communication card 200 can supply power. Though there is no power source 350 in the wireless communication controller set 300, RFID communication receives power from the bare cell 261 disposed in the wireless communication card 200.

Hereinafter, the operation of aspects of the present invention will be described in detail with reference to the FIG. 1.

A user can select a passive mode functioning as an RFID tag or an active mode functioning as an RFID reader through the MCU 330 of the wireless communication controller set 300. When passive mode is selected, the communication controller chip 310 of the wireless communication controller set 300 is set to passive mode. In this case, the RFID communication device 100 communicates with the RFID reader 20 and functions as a general RFID tag.

When active mode is selected, the communication controller chip 310 of the wireless communication controller set 300 is set to active mode. In this case, the RFID communication device 100 communicates with the RFID tag and functions as a general RFID reader. Then, power is supplied to the RFID reader from the power source 350 of the wireless communication controller set 300 or the bare cell 261 of the wireless communication card 200.

In both passive mode and active mode, the history data corresponding to the use of the RFID communication device 100 is stored in the memory 240 of the wireless communication card 200. For example, when the RFID communication device 100 is used for a transportation card, data about means of transportation, sections of a line, fares, and transportation time may be stored in the memory 240. Such data can be easily verified through the output unit 340 of the wireless communication controller set 300.

In the present embodiment of the present invention, although the wireless communication card 200 is connected to the wireless communication controller set 300 included in a mobile communication terminal such as a mobile phone for RFID communication, aspects of the present invention are not limited thereto. The wireless communication card 200 may be used as a data storage device. In other words, the wireless communication card 200 may be connected to a personal computer through the antenna connection terminals 220a, 220b, and 220c to store new data in the memory 240 or process the data stored in the memory 240. The wireless communication card 200 may be used as an emergency power source. When the power of a mobile device such as a mobile phone is exhausted, power may be supplied to the mobile device from the bare cell 261 of the wireless communication card 200 by connecting the bare cell 261 to the mobile device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless communication card comprising:
   a radio frequency (RF) antenna for transmitting and receiving wireless signals;
   a tuning circuit as a frequency filtering circuit connected to the RF antenna;
   a memory for storing data;
   a secondary rechargeable battery comprising a bare cell and two charge/discharge terminals connected to the bare cell;
   a protection circuit for controlling charge and discharge of the bare cell; and
   a plurality of antenna connection terminals connected to the RF antenna, wherein one of the plurality of antenna connection terminals is shared with one of the charge/discharge terminals such that the one terminal is configured to both supply power to a wireless communication controller set of a mobile communication device and connect the memory of the wireless communication card to the wireless communication controller set to transfer data via electrical current.

2. The wireless communication card of claim 1, wherein the tuning circuit is a 13.56 MHz frequency filtering circuit.

3. A radio frequency identification (RFID) communication device comprising the wireless communication card of claim 1.

4. The RFID communication device of claim 3, further comprising said wireless communication controller set including a communication controller chip supporting both an RFID tag mode and reader mode and connected to the wireless communication card.

5. The RFID communication device of claim 4, wherein the communication controller chip is a near field communication (NFC) chip.

6. The RFID communication device of claim 4, wherein the wireless communication controller set further includes a matching circuit that is a frequency filtering circuit connecting the antenna connection terminals of the wireless communication card and the communication controller chip.

7. The RFID communication device of claim 3, wherein the wireless communication controller set further includes an output unit outputting data stored in the memory of the wireless communication card.

8. The RFID communication device of claim 3, wherein the wireless communication controller set further includes a power source.

9. The RFID communication device of claim 3, wherein the wireless communication card further includes a controller unit controlling the memory.

10. A radio frequency identification (RFID) device comprising a wireless communication card configured to connect to a wireless communication controller set of the RFID device, the RFID device comprising:
   a matching circuit for filtering a frequency;
   a communication controller chip for controlling the communication card in passive mode and the wireless communication controller set in active mode;
   a memory for storing data;
   a microcontroller unit for controlling the communication controller chip, wherein the matching circuit is a frequency filtering circuit for connecting to a plurality of antenna connection terminals of the wireless communication card; and
   two charge/discharge terminals connected to a bare cell of the wireless communication card;
   wherein one of the plurality of antenna connection terminals is shared with one of the charge/discharge terminals of the bare cell such that the one terminal is configured to both supply power to the wireless communication controller set and connect the memory of the wireless communication card to the wireless communication controller set to transfer data via electrical current.

11. The RFID device of claim 10, further comprising: an output unit outputting data stored on the memory to a user; and
   a power source powering the communication control chip, the microcontroller unit and the output unit.

12. The RFID device of claim 11, wherein the output unit is a display device or speaker provided in a terminal that is the wireless communication controller set.

13. The RFID device of claim 10, wherein the communication controller chip is a near field communication (NFC) chip.

14. A radio frequency identification (RFID) device comprising a wireless communication card and a wireless communication controller set:
   the wireless communication card comprising:
      a radio frequency (RF) antenna for transmitting and receiving wireless signals;
      a tuning circuit as a frequency filtering circuit connected to the RF antenna;
      a memory for storing data;
      a rechargeable battery comprising a bare cell and two charge/discharge terminals connected to the bare cell;
      a protection circuit for controlling charge and discharge of the bare cell; and
      a plurality of antenna connection terminals connected to the RF antenna, wherein one of the plurality of antenna connection terminals is shared with one of the charge/discharge terminals such that the one terminal is configured to both supply power to the wireless communication controller set and connect the memory of the wireless communication card to the wireless communication controller set to transfer data via electrical current; and
   the wireless communication controller set comprising:
      a matching circuit for filtering a frequency;
      a communication controller chip for controlling the wireless communication card in passive mode and the wireless communication controller set in active mode; and
      a microcontroller unit for controlling the communication controller chip,
      wherein the matching circuit is a frequency filtering circuit for connecting to the plurality of terminals of the antenna of the wireless communication card; and
      wherein one of the plurality of terminals of the antenna connects to the rechargeable battery of the wireless communication card.

15. The RFID device of claim 14, wherein the wireless communication set receives power from the rechargeable battery of the wireless communication card through the two charge/discharge terminals.

16. The RFID device of claim 14, wherein the tuning circuit and the matching circuit are a 13.56 MHz frequency filtering circuit.

17. The RFID device of claim 14, wherein the memory is a data storage device that transmits and receives data through the plurality of antenna terminals.

18. The RFID device of claim 14, wherein the protection circuit comprises:
   a switching device for switching a charge/discharge current path of the wireless communication card according to a charge/discharge control signal; and
   a charge/discharge controller chip for controlling the switching device by generating the charge/discharge control signal.

* * * * *